United States Patent
Kang et al.

(10) Patent No.: US 8,169,491 B2
(45) Date of Patent: May 1, 2012

(54) APPARATUS AND METHOD OF OBTAINING IMAGE AND APPARATUS AND METHOD OF PROCESSING IMAGE

(75) Inventors: Dong-goo Kang, Suwon-si (KR); Ho-cheon Wey, Seongnam-si (KR); Hyun-hwa Oh, Yongin-si (KR); Seong-deok Lee, Suwon-si (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 789 days.

(21) Appl. No.: 12/213,199

(22) Filed: Jun. 16, 2008

(65) Prior Publication Data
US 2009/0185041 A1    Jul. 23, 2009

(30) Foreign Application Priority Data
Jan. 22, 2008  (KR) .................... 10-2008-0006478

(51) Int. Cl.
*H04N 5/225*  (2006.01)
*H04N 3/14*  (2006.01)
*H04N 5/335*  (2011.01)
*H04N 9/083*  (2006.01)

(52) U.S. Cl. .................. 348/208.99; 348/272

(58) Field of Classification Search .............. 348/216.1, 348/221.1, 270–276, 362, 208.1, 222.1, 208.99, 348/208.4; 382/300
See application file for complete search history.

(56) References Cited

U.S. PATENT DOCUMENTS

| | | | | |
|---|---|---|---|---|
| 5,420,635 A | * | 5/1995 | Konishi et al. | 348/362 |
| 5,828,793 A | * | 10/1998 | Mann | 382/284 |
| 6,204,881 B1 | * | 3/2001 | Ikeda et al. | 348/362 |
| 6,778,210 B1 | | 8/2004 | Sugahara | |
| 6,825,884 B1 | * | 11/2004 | Horiuchi | 348/362 |
| 6,876,384 B1 | * | 4/2005 | Hubina et al. | 348/223.1 |

(Continued)

FOREIGN PATENT DOCUMENTS
JP    2008-11119    1/2008
(Continued)

OTHER PUBLICATIONS

Tico, M. et al., *Image Stabilization Based on Fusing the Visual Information in Differently Exposed Images*, IEEE 2007, pp. I-117-I-120.

(Continued)

*Primary Examiner* — Nhan T Tran
*Assistant Examiner* — Tuan Le
(74) *Attorney, Agent, or Firm* — Staas & Halsey LLP

(57) ABSTRACT

Provided are an apparatus and method of obtaining a high-quality image by efficiently processing an image obtained at low-light levels. The image obtaining apparatus comprises a sensor which detects a pixel array value by using a color filter including color pixels for obtaining a color image and a reference pixel for obtaining a reference image used for hand-trembling function estimation; an exposure controller which controls exposure times of the color pixels and the reference pixel; and an image generator which generates a long-exposure color image signal and a short-exposure reference image signal from the detected pixel array value, the long-exposure color image signal and the short-exposure reference image signal being aligned with each other. Accordingly, accurate estimation of the hand-trembling function is possible, thereby enabling the high-quality color image restoration.

21 Claims, 8 Drawing Sheets

U.S. PATENT DOCUMENTS

| | | | |
|---|---|---|---|
| 7,400,332 B2 * | 7/2008 | Schweng et al. | 345/589 |
| 7,409,104 B2 * | 8/2008 | Vitsnudel et al. | 382/284 |
| 7,424,213 B2 * | 9/2008 | Imada | 396/55 |
| 7,450,782 B2 * | 11/2008 | Lim et al. | 382/284 |
| 7,460,168 B2 * | 12/2008 | Horiuchi | 348/362 |
| 7,821,553 B2 * | 10/2010 | Ellis-Monaghan et al. | 348/277 |
| 7,839,437 B2 * | 11/2010 | Kasai et al. | 348/238 |
| 2006/0017837 A1 * | 1/2006 | Sorek et al. | 348/362 |
| 2006/0114340 A1 * | 6/2006 | Sakurai et al. | 348/239 |
| 2006/0256231 A1 * | 11/2006 | Sasaki et al. | 348/373 |
| 2007/0014554 A1 * | 1/2007 | Sasaki et al. | 396/55 |

FOREIGN PATENT DOCUMENTS

| | | |
|---|---|---|
| WO | 2006/068299 | 6/2006 |

OTHER PUBLICATIONS

Tico, M. et al., *Motion Blur Identification Based on Differently Exposed Images*, IEEE 2006, pp. 2021-2024.

Yuan, L. et al., *Blurred/Non-Blurred Image Alignment Using Sparseness Prior* (8 PP.).

Yuan, L. et al., *Image Deblurring with Blurred/Noisy Image Pairs*, ACM Transactions on Graphics, vol. 26, No. 3, Article 1, Jul. 2007, pp. 1-2-1-10.

Extended European Search Report, mailed Jun. 17, 2009, in corresponding European Application No. 08170104.7.

* cited by examiner

APPARATUS AND METHOD OF OBTAINING IMAGE AND APPARATUS AND METHOD OF PROCESSING IMAGE

CROSS REFERENCE TO RELATED APPLICATIONS

This application claims priority from Korean Patent Application No. 10-2008-0006478, filed on Jan. 22, 2008, the disclosure of which is incorporated herein in its entirety by reference.

BACKGROUND OF THE INVENTION

1. Field of the Invention

The present invention relates to an apparatus and method of obtaining and processing an image, and more particularly, to an apparatus and method of obtaining a high-quality color image by efficiently processing an image obtained at low-light levels.

2. Description of the Related Art

As the use of digital camera increases, there are more chances to photograph in low-light situations, such as indoors with dim light or at night. In addition, camera users' demand for a function that can obtain a clear image even under a low-light condition has increased. Accordingly, camera manufacturers have competitively researched and developed digital cameras with great performance in low light. However, there is a limit to obtain a clear image by stabilizing an unstable image caused by hand-trembling of a photographer or removing noise from a photographed image.

SUMMARY OF THE INVENTION

The present invention has been suggested to overcome the foregoing problems, and its object to provide an apparatus and method of obtaining a long-exposure color image and a short-exposure reference image, which are aligned with each other, in order to restore a clearer color image of a high quality in low light without changing the existing structure of cameras.

The present invention further provides an apparatus and method of processing an image in order to obtain a clear color image by using the long-exposure color image and the short-exposure reference image that are aligned with each other.

The present invention discloses an image obtaining apparatus comprising: a sensor which detects a pixel array value by using a color filter including color pixels for obtaining a color image and a reference pixel for obtaining a reference image used for hand-trembling function estimation; an exposure controller which controls exposure times of the color pixels and the reference pixel; and an image generator which generates a long-exposure color image signal and a short-exposure reference image signal from the detected pixel array value, the long-exposure color image signal and the short-exposure reference image signal being aligned with each other.

The present invention also discloses a method of obtaining an image, the method comprising: obtaining a pixel array value by controlling exposure times of color pixels for obtaining a color image and a reference pixel for obtaining a reference image used for hand-trembling function estimation, the color pixels and the reference pixel being included in a color filter; and generating a long-exposure color image signal and a short-exposure reference image signal by using the obtained pixel array value, the long-exposure color image signal and the short-exposure reference image signal being aligned with each other.

The present invention also discloses an image processing apparatus comprising: an image obtaining unit which obtains a long-exposure color image signal and a short-exposure reference image signal, which are aligned with each other, by controlling an exposure time of a color filter including color pixels for obtaining a color image and a reference pixel for obtaining a reference image used for hand-trembling function estimation; a function estimating unit which estimates a hand-trembling function by using the long-exposure color image signal and the short-exposure reference image signal; and an image restoring unit which generates a restored image signal by performing deconvolution on the long-exposure color image signal by the use of the estimated hand-trembling function.

The present invention also discloses a method of processing image, the method comprising: obtaining a long-exposure color image signal and a short-exposure reference image signal, which are aligned with each other, by controlling an exposure time of a color filter including color pixels for obtaining a color image and a reference pixel for obtaining a reference image used for hand-trembling function estimation; estimating a hand-trembling function by using the long-exposure color image signal and the short-exposure reference image signal; and generating a restored image signal by performing deconvolution on the long-exposure color image signal by using the estimated hand-trembling function.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. Hereinafter, in describing the present invention, detailed descriptions of relevant functions or structures well-known to those skilled in the art will be omitted when it is considered that the descriptions obscure the point of the present invention. The terms used herein are defined in consideration of the functions of elements in the present invention, and may be varied according to the intentions or the customs of a user and an operator.

Figure 1:
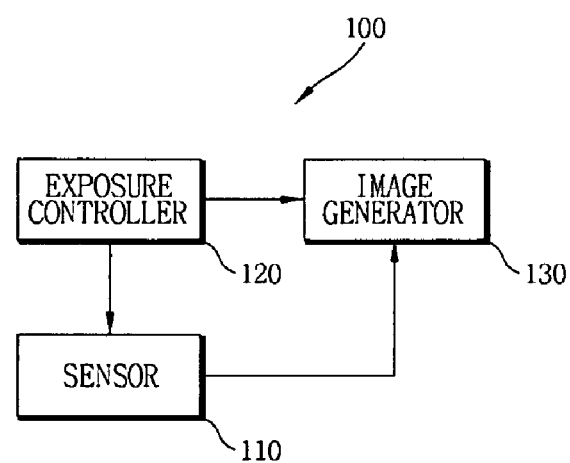
FIG. 1 is a block diagram of an image obtaining apparatus according to an embodiment of the present invention.

FIG. 1 is a block diagram of an image obtaining apparatus 100 according to an embodiment of the present invention. Referring to FIG. 1, the image obtaining apparatus 100 includes a sensor 110, an exposure controller 120, and an image generator 130.

An image input to an image obtaining apparatus such as a digital camera can be expressed by a following Equation 1.

$$B = I \otimes k,$$ Equation 1

Here, B denotes an input image, I denotes a high-quality image, K indicates a blur kernel, that is, a point spread function (PSF) of hand trembling, and $\otimes$ denotes a convolution operator. Therefore, it is required to accurately estimate the blur kernel so as to obtain a high-quality image.

The image obtaining apparatus 100 has a purpose for obtaining long-exposure images and short-exposure images, which are perfectly aligned images. The long-exposure images and the short-exposure image are obtained by photographing the same scene that is required for accurately estimating PSF of hand-trembling. It is known that PSF estimation accuracy is substantially reduced if image signals obtained to be used for PSF estimation are not aligned correctly.

The sensor 110 senses an image by obtaining a pixel array value that is color information transmitted through pixels forming a color filter. The sensor 110 includes an image sensor such as a charge-coupled device (CCD) or complementary metal oxide semiconductor (CMOS) to sense an image. The color filter may be disposed in front of an optical element of an image sensor like in the typical digital camera.

According to the current embodiment of the present invention, the color filter may be a generally used color filter. For example, color pixels included in the color filter include a red (R) pixel, a green (G) pixel, and a blue (B) pixel. Conventionally, a pixel array value obtained by the color filter is simply used to obtain a color image.

However, in the present invention, an exposure time for pixels included in the color filter is controlled to obtain a color image and a reference image which are correctly aligned with each other. The reference image is an image to be referred to for estimating the PSF of hand-trembling (hereinafter, it will be referred to as a "hand-trembling function").

The reference image is created by short exposure, and thus a reference pixel to be used to obtain the reference image may be a pixel that can transmit light with high sensitivity. For instance, the reference pixel may be a black and white (W) pixel or a green (G) pixel. However, a type or system of the color filter, or colors of pixels forming the color filter can be varied in different ways as long as the hand-trembling function can be efficiently estimated.

Therefore, by using an array of the color filter that is formed of R, G, B, and W pixels, the sensor 110 can obtain a three-channel long-exposure color pixel array value and a one-channel short-exposure monochrome array value.

The exposure controller 120 controls the exposure time for the color pixel and the reference pixel of the sensor 110. The exposure controller 120 synchronizes exposure starting times for the color pixel and the reference pixel with each other, and controls the exposure time for the color pixel to be longer than that the exposure time for the reference pixel. In this case, since the reference image is obtained within a substantially short time, the exposure controller 120 may control the sensor 110 to sense the reference image with high sensitivity.

Furthermore, the exposure controller 120 may control the sensor 110 such that short-exposure of the reference pixel can take place repeatedly while the exposure of the color pixel is maintained. The locus of hand trembling can be estimated by investigating information of changes of the reference images obtained by repeating the short-exposure of the reference pixel, and information about the estimated locus of hand trembling can be used as initial information for the hand-trembling function.

The image generator 130 generates a long-exposure color image signal and a short-exposure reference image signal, which are aligned correctly, from the sensed pixel array value. According to the current embodiment of the present invention, the image generator 130 performs interpolation on the pixel array value detected by the color pixel and the reference pixel and generates a long-exposure reference image signal and a short-exposure image signal for each color of the color pixels.

As described above, according to the current embodiment of the present invention, since a long-exposure color image and a short-exposure reference image which are perfectly aligned with each other and have the same starting time of obtaining can be obtained, an alignment error is avoided from the beginning, and thus there is no need to execute additional procedures for aligning the image afterwards.

Figure 2A:
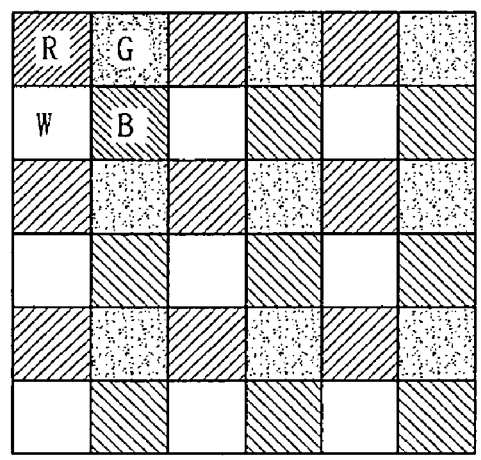
FIGS. 2A and 2B show configurations of a color filter array used for a method of obtaining image according to an embodiment of the present invention.
Figure 2B:
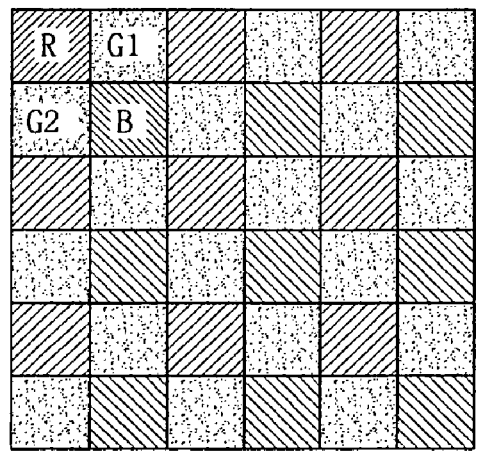

FIGS. 2A and 2B show configurations of a color filter array used for a method of obtaining image according to an embodiment of the present invention.

FIG. 2A shows a color filter array that includes R, G, B, and W pixels. In FIG. 2A, the R, G, and B pixels are used as color pixels and the W pixel is used as a reference pixel.

FIG. 2B shows a color filter array that includes R, G, and B pixels. In FIG. 2B, R, G1 and B pixels are used as color pixels, and G2 is used as a reference pixel. Additionally, in FIG. 2B, G1 and G2 pixels both of which are G pixels are shown individually since the G1 pixel is used as a color pixel and the G2 pixel is used as a reference pixel.

Figure 3A:
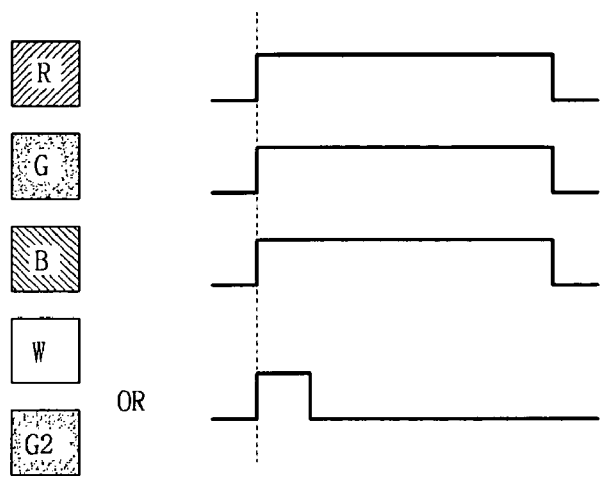
FIGS. 3A and 3B are diagrams for explaining how the exposure time of each color filter is controlled according to an embodiment of the present invention.
Figure 3B:
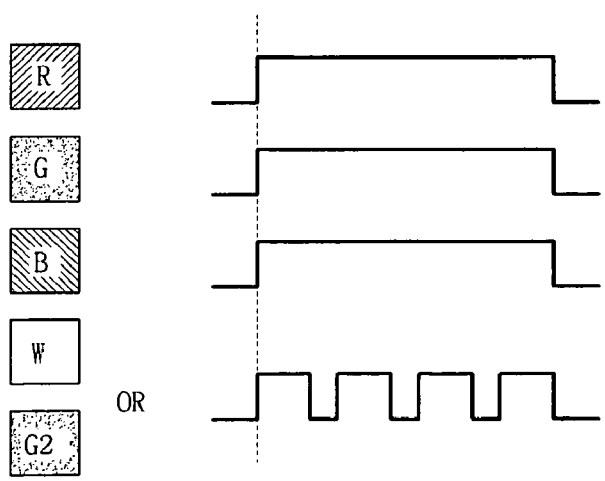

FIGS. 3A and 3B are diagrams for explaining how the exposure time of each color filter is controlled according to an embodiment of the present invention.

In FIGS. 3A and 3B, a horizontal axis represents time. As shown in FIG. 3A, the exposure controller 120 synchronizes exposure starting times of the color pixels (R, G, and B pixels) and the reference pixel (W or G2 pixel) with each other, and controls the exposure time of the color pixel (R, G, and B pixels) to be longer than the exposure time of the reference pixel (W or G2 pixel).

Additionally, the exposure controller 120 may control the sensor 110 such that the short-exposure of the reference pixel takes place repeatedly while the color pixels are being exposed in order to obtain the initial information of the hand-trembling function as shown in FIG. 3B.

Figure 4:
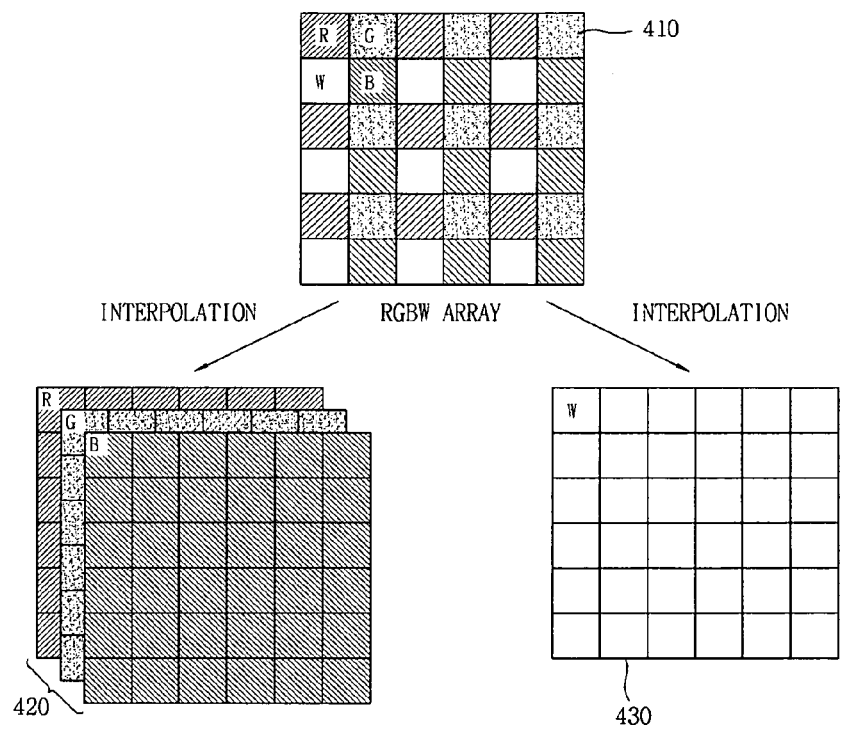
FIG. 4 shows how to generate a long-exposure color image and a short-exposure monochrome image, which have the same resolution, from a pixel array value of a color filter that uses a black and white pixel as a reference pixel.

FIG. 4 shows how to generate a long-exposure color image and a short-exposure black-and-white image, which have the same resolution, from a pixel array value of a color filter that uses a black and white pixel as a reference pixel.

As shown in FIG. 4, a Bayer-type color filter can generate a three-channel long-exposure RGB color image 420 and a single-channel black-and-white image 430 by interpolating the pixel array value obtained from a color pixel array 410.

Figure 5:
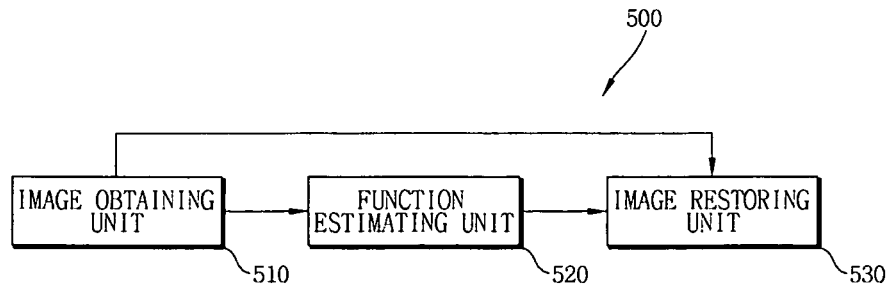
FIG. 5 is a block diagram of an image processing apparatus according to an embodiment of the present invention.

FIG. 5 is a block diagram of an image processing apparatus 500 according to an embodiment of the present invention.

The image processing apparatus 500 includes an image obtaining unit 510, a function estimating unit 520, and an image restoring unit 530.

The image obtaining unit 510 has a structure corresponding to the structure of the image obtaining apparatus 100 in FIG. 1. The image obtaining unit 510 has a color filter including color pixels for obtaining a color image and a reference pixel for obtaining a reference image used for estimating a hand-trembling function, controls an exposure time of the color pixels and an exposure time of the reference pixel to obtain a long-exposure color image signal and a short-exposure reference image signal which are correctly aligned with each other.

The image obtaining unit 510 synchronizes exposure starting times for the color pixels and the reference pixel, and controls the exposure time of the color pixels to be longer than the exposure time of the reference pixel so as to obtain the long-exposure color image signal and the short-exposure reference image signal.

The function estimating unit 520 estimates the hand-trembling function, using the long-exposure color image signal and the short-exposure reference image signal.

According to the current embodiment of the present invention, the hand-trembling function can be calculated by an equation minimizing an objective function such as the following Equation 2 that satisfies $k_i \geq 0$ and $$\sum_i k_i = 1.$$

$$k^* = \mathop{\mathrm{argmin}}_k \|B - I \otimes k\|^2 + \lambda \|k\|^2 \qquad \text{Equation 2}$$

Here, $\Sigma_i \|k_i\|^2$ is the Tikhonov regulation term for stabilizing a solution and a parameter $\lambda$ can be fixed to 3. However, the Tikhonov regulation term is only an example, and any other term that can represent the feature of the hand-trembling function can be used as a regulation term. In addition, the parameter may be a fixed value, but it can be a value varying at each time of repeating during optimization.

According to the current embodiment of the present invention, a value representing a long-exposure color image signal is substituted for B, and a value representing a short-exposure reference image signal is substituted for I, so that the hand-trembling function can be estimated.

Meanwhile, according to the current embodiment of the present invention, reference images are obtained by repeating the short-exposure of the reference pixel while the color pixels are being exposed, and information about the reference images is used as initial information of the hand-trembling function, and the hand-trembling function, therefore, can be estimated more accurately and faster.

To this end, the image obtaining unit 510 collects a plurality of short-exposure reference image signals by repeating the short-exposure of the reference pixel while the color pixels are being exposed. Then, since the signals of the reference images which have been photographed at predetermined time intervals are obtained, the function estimating unit 520 traces the locus of the hand-trembling by means of a motion estimation method using the collected reference image signals. The traced locus of the hand-trembling is used as the initial information of the hand-trembling function, hence enabling the hand-trembling function to be estimated more accurately and faster.

The image restoring unit 530 performs deconvolution on the long-exposure color image signal that is obtained by the image obtaining unit 510 using the estimated hand-trembling function and generates a restored image signal.

Furthermore, according to the current embodiment of the present invention, on the long-exposure color image signal and the short-exposure reference image signal used for estimating the hand-trembling function can be performed the following process.

First, the function estimating unit 520 reduces noise of the long-exposure color image signal and a short-exposure reference image signal. Then, the function estimating unit 520 converts the noise-reduced long-exposure color image signal into a long-exposure single-channel image signal so as to unify the number of channels of the image signals that are used for estimating the hand-trembling function.

Various methods can be used to unify the number of the channels of the image signals. For example, amongst the long-exposure color images, an image of one of three channels, for example, red, green, and blue may be used, or an average image of an RGB image may be generated to be a single-channel image. Alternatively, an RGB image may be inverted into a grey image to generate a single-channel image.

Next, the function estimating unit 520 estimates the hand-trembling function by using the converted long-exposure single-channel image signal and the noise-reduced short-exposure reference image signal.

Figure 6:
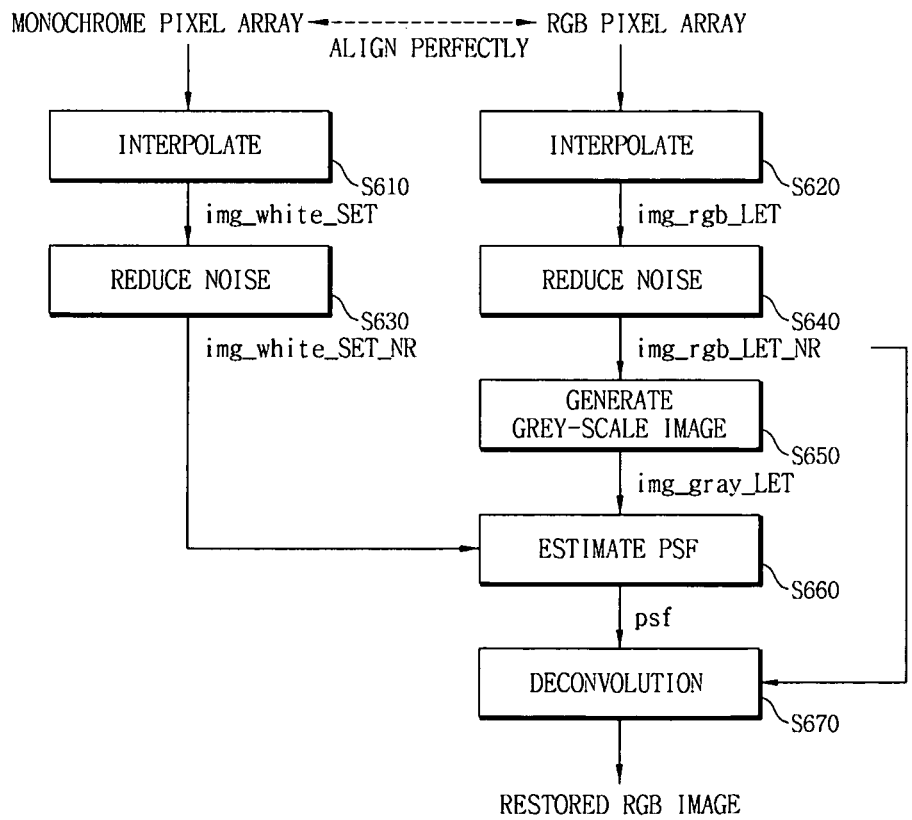
FIG. 6 is a flowchart of a method of obtaining a restored image using a pixel array value according to an embodiment of the present invention.

FIG. 6 is a flowchart of a method of obtaining a restored image using a pixel array value according to an embodiment of the present invention. In FIG. 6, the process is performed on an image generated by using the RGBW pixel array as shown in FIG. 4. According to the current embodiment of the present invention, a monochrome (W) pixel array and an RGB pixel array, which are obtained by using the RGBW pixel array, are aligned perfectly with each other.

A pixel array value obtained from the monochrome pixel array is interpolated to generate a short-exposure black-and-white image img_white_SET, that is, a reference image (operation S610). Then, a pixel array value obtained from the RGB pixel array is interpolated to generate a long-exposure color image img_rgb_LET (operation S620).

Noise of the single-channel black-and-white image is reduced to obtain a noise-reduced short-exposure black-and-white image img_white_SET_NR (operation S630). Furthermore, the noise-reduced long-exposure color image img_rgb_LET_NR is also obtained by reducing noise of the long-exposure color image img_rgb_LET (operation S640). In this case, in consideration of the fact that the short-exposure black-and-white image has a short exposure time, thus having more noise than the long-exposure color image does, a noise reduction filter is used for the short-exposure black-and-white image.

Since the long-exposure color image img_rgb_LET_NR has three channels and the short-exposure black-and-white image img_white_SET_NR has one channel, the long-exposure color image img_rgb_LET_NR and the short-exposure black-and-white image img_white_SET_NR need to have the same number of the channels to estimate PSF of hand-trembling, that is, a hand-trembling function. To this end, gray conversion is performed on the long-exposure color image img_rgb_LET_NR to generate a gray-scale image image_gray_LET (operation S650).

Then, the noise-reduced short-exposure black-and-white image img_white_LET_NR and the gray-scale image img_gray_LET is used to estimate the PSF of hand-trembling (operation S660). The estimated PSF and the long-exposure color image img_rgb_LET_NR that has been already obtained are used to generate a restored color image (or a restored RGB image) (operation S670).

Figure 7:
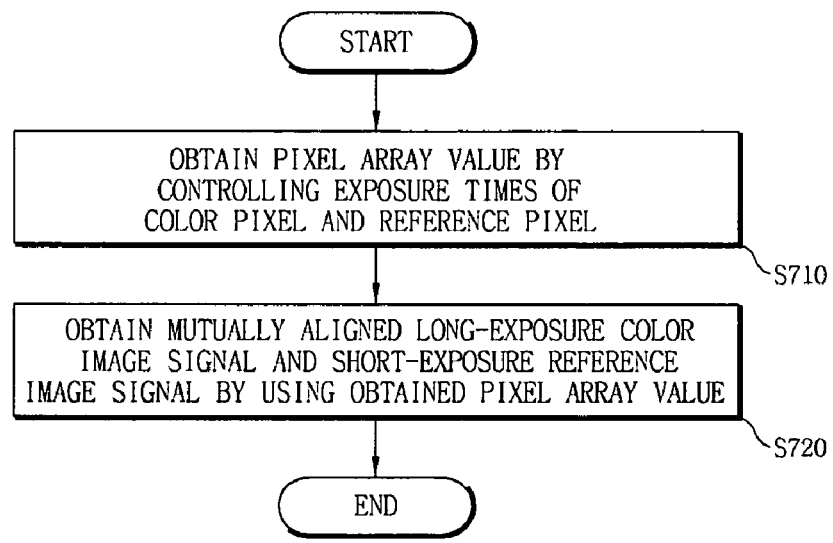
FIG. 7 is a flowchart of a method of obtaining an image according to an embodiment of the present invention.

FIG. 7 is a flowchart of a method of obtaining an image according to an embodiment of the present invention.

A pixel array value is obtained by controlling exposure times of color pixels and a reference pixel which are included in a color filter (operation S710). In this case, the color pixels are used for obtaining a color image and the reference pixel is used for obtaining a reference image for hand-trembling function estimation. To control the exposure times in operation S710, the exposure starting times of the color pixels and the reference pixel are synchronized with each other, and the exposure time of the color pixels is set to be longer than the exposure time of the reference pixel.

Long-exposure color image signals and a short-exposure reference image signal which are aligned correctly with one another are obtained by using the obtained pixel array value (operation S720). According to the current embodiment of the present invention, in operation S720, interpolation may be performed on the pixel array value obtained from the color pixels and the reference pixel to generate long-exposure image signals of respective colors of the color pixels and short-exposure image signals.

Figure 8:
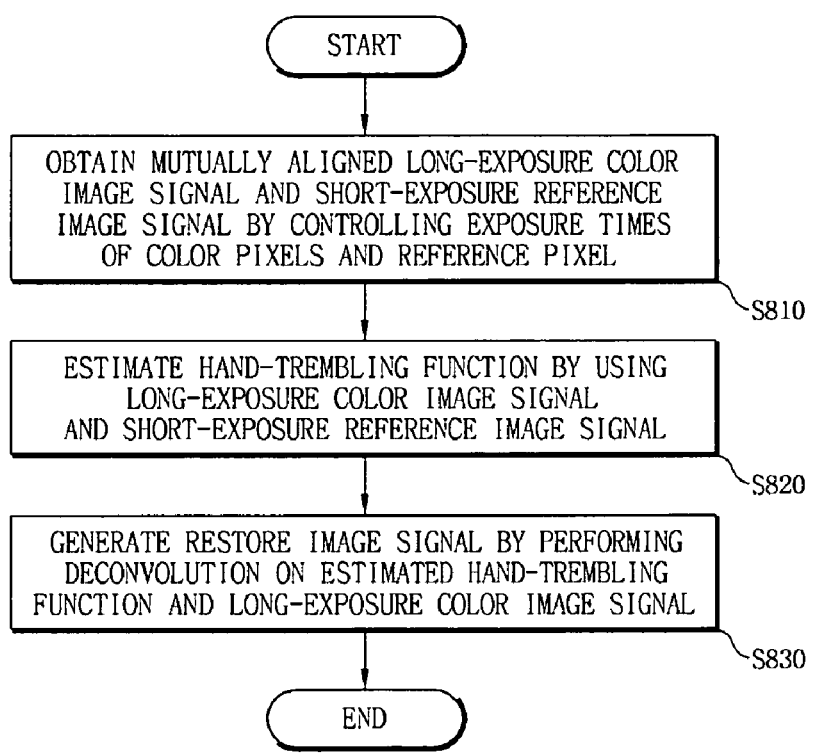
FIG. 8 is a flowchart of a method of processing an image according to an embodiment of the present invention.

FIG. 8 is a flowchart of a method of processing an image according to an embodiment of the present invention.

Exposure times of color pixels and a reference pixel that are included in a color filter are controlled to obtain long-exposure color image signals and a short-exposure reference image signal that are aligned correctly with each other (operation S810). In this case, the color pixels are used for obtaining a color image and the reference pixel is used for obtaining a reference image for hand-trembling function estimation. In addition, the exposure starting times of the color pixels and the color pixels and the reference pixel are synchronized with each other, and the exposure times of the color pixels is set to be longer than the exposure time of the reference pixel.

The hand-trembling function is estimated by using the long-exposure color image signal and the short-exposure reference image signal (operation S820).

Deconvolution is performed on the long-exposure color image signal by using the estimated hand-trembling function to generate a restored image signal (operation S830).

In operation S810, a plurality of short-exposure reference image signals are collected by repeating short-exposures of the reference pixel while the color pixels are being exposed. Then, in operation S820, the locus of hand-trembling is traced using the obtained reference image signals and the locus information can be used as the initial information of the hand-trembling function. Accordingly, the hand-trembling function can be estimated more accurately and faster.

In operation S820, noise of the long-exposure color image signal and the short-exposure reference image signal is reduced. To unify the number of the channels of the long-exposure color image signal and the short-exposure reference image signal, the noise-reduced long-exposure color image signal is converted into a long-exposure single-channel image signal. Subsequently, the converted long-exposure single-channel image signal and the noise-reduced short-exposure reference image signal are used to estimate the hand-trembling function.

Figure 9:
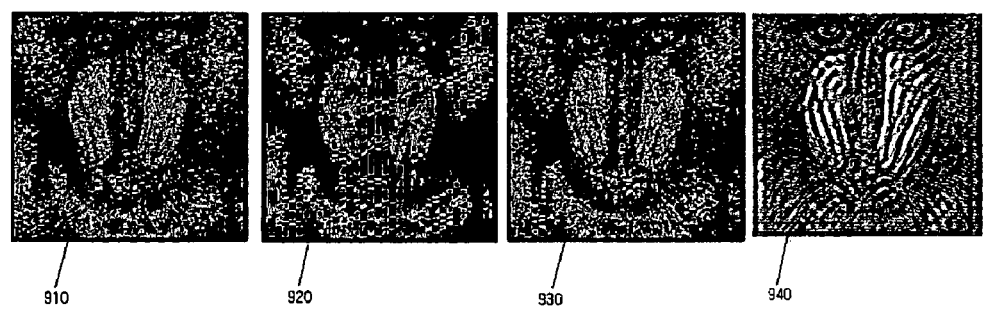
FIG. 9 shows images that are obtained according to the methods of obtaining and processing an image in accordance with the present invention.

FIG. 9 shows images that are obtained according to the methods of obtaining and processing an image in accordance with the present invention.

An image 910 is a high-sensitivity short-exposure black-and-white image, and an image 920 is a low-sensitivity long-exposure color image (shown in black and white in FIG. 9). If there is an alignment error, the accurate PSF estimation is not possible, which causes severe artifact that leads to the restoration of a low-quality image like an image 940.

However, according to the current embodiment of the present invention, a problem of inaccurate estimation of the hand-trembling function due to the alignment error can be solved when a high-sensitive short-exposure black-and-white image and a low-sensitive color image are used.

When the color image 930 restored by the image processing method according to the present invention is compared to the color image 940 restored by the use of the inaccurate hand-trembling function, it is obvious that the image 930 restored according to the present invention is of a higher quality than the image 940.

According to the present invention, exposure times of color pixels and a reference pixel included in a color filter are controlled, and hence a long-exposure color image signal and a short-exposure reference image signal both of which have the same image obtaining starting time and are aligned perfectly with each other. An alignment error is fundamentally avoided in such the long-exposure color image signal and the short-exposure reference image signal, and thus the accurate estimation of a hand-trembling function is possible.

Furthermore, by using the hand-trembling function estimated according to the present invention, a clear color image can be restored. According to the present invention, an apparatus and method of processing an image are useful to photograph landscapes at night, conduct night surveillance, photograph indoor scenes, and so on.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An image obtaining apparatus comprising:
   a sensor to detect a plurality of pixel values of a plurality of pixels, including detecting color pixel values of multi-color color pixels of the plurality of pixels and monochromatic reference pixel values of monochromatic reference pixels of the plurality of pixels, by using a color filter including the multi-color color pixels configured to obtain a color image and the monochromatic reference pixels configured to obtain a monochromatic reference image, which are used for hand-trembling function estimation;
   an exposure controller configured to control exposure times of the multi-color color pixels and the monochromatic reference pixels; and
   an image generator configured to generate a long-exposure color image signal corresponding to the obtaining of the color image from the detected color pixel values and a short-exposure reference image signal from the detected monochromatic reference pixel values, the long-exposure color image signal and the short-exposure reference image signal being aligned with each other.

2. The image obtaining apparatus of claim 1, wherein the exposure controller synchronizes exposure starting times of the multi-color color pixels and the monochromatic reference pixels to start with each other and controls the exposure time of the multi-color color pixels to be longer for the obtaining of the color image than the exposure time of the monochromatic reference pixels.

3. The image obtaining apparatus of claim 2, wherein the exposure controller controls the sensor such that a short-exposure of the monochromatic reference pixels takes place repeatedly while the multi-color color pixels are being exposed for the obtaining of the color image in order to obtain initial information of the hand-trembling function.

4. The image obtaining apparatus of claim 1, wherein the image generator performs interpolation on the plurality of pixel values detected through the multi-color color pixels and the monochromatic reference pixels so as to generate long-exposure image signals of respective colors of the multi-color color pixels and a short-exposure image signal of the monochromatic reference pixels.

5. The image obtaining apparatus of claim 1, wherein the image generator is configured to obtain a single-channel reference image signal and a multi-channel color image signal.

6. The image obtaining apparatus of claim 1, wherein the monochromatic reference pixels are white (W) pixels or green (G) pixels.

7. The image obtaining apparatus of claim 1, wherein all of the monochromatic reference pixels of the image obtaining apparatus are pixels of the same color.

8. A method of obtaining an image, the method comprising:
  obtaining a plurality of pixel values of a plurality of pixels, including color pixel values of multi-color color pixels of the plurality of pixels and monochromatic reference pixel values of monochromatic reference pixels of the plurality of pixels, by controlling exposure times of the multi-color color pixels for obtaining a color image and the monochromatic reference pixels for obtaining a monochromatic reference image used for hand-trembling function estimation, the multi-color color pixels and the monochromatic reference pixels being included in a color filter; and
  generating a long-exposure color image signal corresponding to the obtaining of the color image from the detected color pixel values and a short-exposure reference image signal based on the monochromatic reference pixel values, the long-exposure color image signal and the short-exposure reference image signal being aligned with each other.

9. The method of claim 8, wherein, in the controlling of the exposure times, exposure starting times of the multi-color color pixels and the monochromatic reference pixels are synchronized to start with each other, and the exposure time of the multi-color color pixels for the obtaining of the color image is set to be longer than the exposure time of the monochromatic reference pixels.

10. The method of claim 9, wherein, in the controlling of the exposure times, the exposure time of the monochromatic reference pixels is controlled such that a short-exposure of the monochromatic reference pixels takes place repeatedly while the multi-color color pixels are being exposed for the obtaining of the color image in order to obtain initial information of the hand-trembling function.

11. The method of claim 8, wherein, in the generating of the image signals, interpolation is performed on the plurality of pixel values detected through the multi-color color pixels and the monochromatic reference pixels so as to generate long-exposure image signals of respective colors of the multi-color color pixels for the obtaining of the color image from the multi-color color pixels and a short-exposure image signal from the monochromatic reference pixels.

12. An image processing apparatus comprising:
  an image obtaining unit which obtains a long-exposure color image signal and a short-exposure reference image signal, which are aligned with each other, by controlling exposure times of a sensor, the sensor being configured to detect a plurality of pixels values of a plurality of pixels, including color pixel values of multi-color color pixels of the plurality of pixels and monochromatic reference pixel values of monochromatic reference pixels of the plurality of pixels, by using a color filter including the multi-color color pixels for obtaining a color image and the monochromatic reference pixels for obtaining a monochromatic reference image;
  a function estimating unit which estimates a hand-trembling function based on the long-exposure color image signal and the short-exposure reference image signal; and
  an image restoring unit which generates a restored image signal by performing deconvolution on the long-exposure color image signal, corresponding to the obtaining of the color image using the multi-color color pixels, based on the estimated hand-trembling function.

13. The image processing apparatus of claim 12, wherein the image obtaining unit obtains the long-exposure color image signal and the short-exposure reference image signal by synchronizing exposure starting times of the multi-color color pixels and the monochromatic reference pixels to start with each other, respectively, and controlling the exposure time of the multi-color color pixels for the obtaining of the color image to be longer than the exposure time of the monochromatic reference pixels.

14. The image processing apparatus of claim 13, wherein the image obtaining unit collects a plurality of short-exposure reference image signals by controlling short-exposure of the monochromatic reference pixels to take place repeatedly for the monochromatic reference image while the multi-color color pixels are being exposed for the obtaining of the color image, and the function estimating unit obtains information by tracing the locus of hand-trembling based on the collected reference image signals and uses the information as initial information of the hand-trembling function.

15. The image processing apparatus of claim 12, wherein the function estimating unit reduces noise of the long-exposure color image signal and the short-exposure reference image signal, converts the noise-reduced long-exposure color image signal into a long-exposure single-channel image signal, and estimates the hand-trembling function based on the converted long-exposure single-channel image signal and the noise-reduced short-exposure reference image signal.

16. The image processing apparatus of claim 12, wherein the function estimating unit is configured to convert a multi-channel color image signal into a single-channel color image signal.

17. The image processing apparatus of claim 16, wherein the conversion involves using one of the multiple channels of the multi-channel color image signal as the single-channel color image signal or wherein the conversion involves averaging the multiple channels of the multi-channel color image signal into a single-channel color image signal or wherein the conversion involves inverting the multiple channels of the multi-channel image signal into a single-channel grey image signal.

18. A method of processing image, the method comprising:
  obtaining a long-exposure color image signal and a short-exposure reference image signal, which are aligned with each other, by controlling respective exposure times of a plurality of pixels, including multi-color color pixels of the plurality of pixels for obtaining the long-exposure color image signal and monochromatic reference pixels of the plurality of pixels for obtaining the short-exposure reference image signal;

estimating a hand-trembling function based on the long-exposure color image signal and the short-exposure reference image signal; and generating a restored image signal by performing deconvolution on the long-exposure color image signal based on the estimated hand-trembling function.

19. The method of claim 18, wherein the obtaining of the image signals, exposure starting times of the multi-color color pixels for the long-exposure color image signal and the monochromatic reference pixel for the short exposure color image signal are synchronized to start with each other, and the exposure time of the multi-color color pixels for the obtaining of the long-exposure color image signal is set to be longer than the exposure time of the monochromatic reference pixels.

20. The method of claim 19, wherein, in the obtaining of the image signals, a plurality of the short-exposure image signals are collected by controlling short-exposures of the monochromatic reference pixels to take place repeatedly while the multi-color color pixels for the long-exposure color image signal are being exposed, and in the estimating of the hand-trembling function, information is obtained by tracing the locus of hand-trembling based on the collected plurality of short exposure image signals and the obtained information is used as initial information of the hand-trembling function.

21. The method of claim 18, wherein the estimating of the hand-trembling function comprises:

reducing noise of the long-exposure color image signal and the short-exposure image signal;

converting the noise-reduced long-exposure color image signal into a long-exposure single-channel image signal; and estimating the hand-trembling function based on the converted long-exposure single-channel image signal and the noise-reduced short-exposure reference image signal.

* * * * *